US007082131B2

United States Patent
Yamauchi et al.

(10) Patent No.: US 7,082,131 B2
(45) Date of Patent: Jul. 25, 2006

(54) NETWORK COMMUNICATION SYSTEM WITH RELAY NODE FOR BROADCASTS AND MULTICASTS

(75) Inventors: Masaki Yamauchi, Osaka (JP); Makiko Kaji, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 969 days.

(21) Appl. No.: 10/062,408

(22) Filed: Feb. 5, 2002

(65) Prior Publication Data

US 2002/0126670 A1  Sep. 12, 2002

(30) Foreign Application Priority Data

Mar. 12, 2001 (JP) .............................. 2001-068074

(51) Int. Cl.
H04L 12/28 (2006.01)
H04L 12/56 (2006.01)

(52) U.S. Cl. ........................................ 370/390; 370/400
(58) Field of Classification Search ................ 370/390, 370/240, 232, 237, 338, 352, 400, 420, 392, 370/238, 389, 428; 709/203–206, 224, 238
See application file for complete search history.

(56) References Cited

U.S. PATENT DOCUMENTS 5,583,860 A * 12/1996 Iwakawa et al. ............ 370/232
6,385,644 B1 * 5/2002 Devine et al. ............... 709/206
6,714,550 B1 * 3/2004 Yamamoto et al. .......... 370/400
2002/0035602 A1 * 3/2002 Garcia-Luna-Aceves et al. ............. 709/204
2002/0039357 A1 * 4/2002 Lipasti et al. ................ 370/338
2003/0028632 A1 * 2/2003 Davis .......................... 709/224

OTHER PUBLICATIONS

Jue, J.P.; Mukherjee, B.; Multiconfiguration multihop protocols (MMPs): a new class of protocols for packet-switched WDM optical networks, INFOCOM '98. Seventeenth Annual Joint Conference of the IEEE Computer and Communications Societies. Proceedings. IEEE; vol. 2, Mar. 29-Apr. 2, 1998 pp. 816-823 vol. 2.*
Sharony, J.; Stern, T.E.; Yao Li; The universality of multi-dimensional switching networks, Networking, IEEE/ACM Transactions on vol. 2, Issue 6, Dec. 1994 pp. 602-612.*

* cited by examiner

*Primary Examiner*—Chi Pham
*Assistant Examiner*—Prenell Jones
(74) *Attorney, Agent, or Firm*—Venable LLP; Michael A. Sartori

(57) ABSTRACT

A network communication system sends identical information from a source node to a plurality of destination nodes by first sending the information from the source node to a predetermined relay node, then sending the information from the relay node to the destination nodes over predetermined communication paths. The predetermined communication paths connect the destination nodes to the relay node in a star topology. The star topology greatly simplifies the routing of the information, while automatically avoiding looped paths, and enables the identical information to arrive at all destination nodes in real time, substantially simultaneously.

7 Claims, 10 Drawing Sheets

NETWORK COMMUNICATION SYSTEM WITH RELAY NODE FOR BROADCASTS AND MULTICASTS

BACKGROUND OF THE INVENTION

1. Field of the Invention

The present invention relates to a network communication system, and more particularly to broadcasting and multicasting in a network communication system, especially one in which multiple networks are interconnected to form an internetwork or internet.

2. Description of the Related Art

Internet communication has generally been one-to-one (unicast), as in electronic mail (e-mail) and the worldwide web (WWW). Recently, however, there has been a growing need to use internets for various one-to-many communication purposes, including television and radio broadcasts, teleconferencing, web data distribution, and real-time distribution of multimedia information. In this type of communication, generally referred to as multicasting or broadcasting, packets containing the same user information must be sent to a plurality of destinations simultaneously. This leads to difficult problems not encountered in unicasting.

For example, conventional internet protocol (IP) technology, described in the document entitled Request for Comments 791, requires complicated routing optimization procedures to find optimal transmission paths from a source node to destination nodes during broadcasting (as described in Request for Comments 919) and multicasting (described in Request for Comments 1112). These complicated routing optimization systems include schemes known as Flooding, Spanning Trees, Source Based Tree (SBT), Reserve Path Broadcasting (RPB), Truncated Reverse Path Broadcasting (TRPB), Reverse Path Multicast (RPM), and Shared Tree. In addition, much copying of user data is required.

Multicasting and broadcasting using these routing optimization schemes presents the following problems:

(1) Complicated Routing to Avoid Looping Paths

A looped path makes it impossible for packets to reach their final destinations, not only preventing the intended communication but also causing a prodigious increase in network traffic. It is necessary to eliminate loops on the paths from the packet source to each destination. There are established routing procedures for defining such loop-free paths, but while a unicast requires the routing of only a single path, a multicast or broadcast requires the definition of loop-free paths for all destinations, so inevitably the routing algorithm becomes more complicated. Typical examples of the routing algorithms conventionally used in multicast and broadcast processing include the Distance Vector Multicast Routing Protocol (DVMRP) and Multicast Open Shortest Path First (MOPSF).

(2) Poor Network Reliability

In a multicast or broadcast, it is a general rule that the number of nodes along a path from the source to a destination (the hop count) differs from path to path. The degree of congestion and other factors also vary from path to path, and it is not always possible for the necessary packets (multicast or broadcast packets) to be sent to all intended destinations. For example, as the hop count increases, the possibility that the path may include a highly congested node increases, so the probability that multicast (or broadcast) packets may be lost due to overflow of a buffer at a highly congested node becomes higher.

(3) Poor Real-Time Performance and Simultaneity of Communications

In a multicast or broadcast, it is generally true, as noted above, that the hop count to the destination varies from path to path, but when the hop count varies, the round trip time (RTT) usually also varies from path to path, and accordingly the multicast (or broadcast) packets fail to arrive at all destinations simultaneously. In addition to the problem of loss of simultaneity in arrival of packets, some types of applications may have problems in maintaining real-time communication.

(4) Uneven Bandwidth

The heterogeneity of the networks involved in an internet multicast or broadcast generally prevents all receivers (destinations) from receiving the multicast or broadcast information over communication links of the same bandwidth. Different receivers have network connections with different bandwidths. This problem exacerbates problems (2) and (3) noted above.

(5) Repeated Copying at Relay Nodes

It has been necessary to copy data (user information) at relay nodes, the number of required copies being equal to the number of destinations.

SUMMARY OF THE INVENTION

An object of the present invention is to simplify the routing of broadcasts and multicasts in a communication network.

Another object of the invention is to improve the quality of broadcasts and multicasts in a communication network.

Another object is to reduce the amount of copying needed for a multicast or broadcast.

The invention provides a method of sending identical information from a source node to a plurality of destination nodes in a communication network, and a communication network system implementing the invented method.

The invented method is a two-step method in which the identical information is first sent from the source node to a predetermined relay node, and is then sent from the relay node to the destination nodes over predetermined communication paths connecting the destination nodes to the relay node in a star topology.

Use of the relay node and star topology greatly simplifies the routing of the information, while automatically avoiding looped paths. Virtual addresses can be used to further simplify routing. Furthermore, the paths can be prearranged so as to have equal and adequate bandwidths, assuring that the information arrives at all destinations substantially simultaneously, in real time, thereby improving multicast or broadcast quality and reliability.

The information sent to the destination nodes may include a time-to-live parameter, which is set to a minimum value at the relay node. This provides a simple way to ensure that the information does not propagate beyond its intended destinations.

The information can be sent by wavelength division multiplexing, using the same wavelength for all destination nodes, in which case the information does not have to be copied at the relay node.

DETAILED DESCRIPTION OF THE INVENTION

Figure 1:
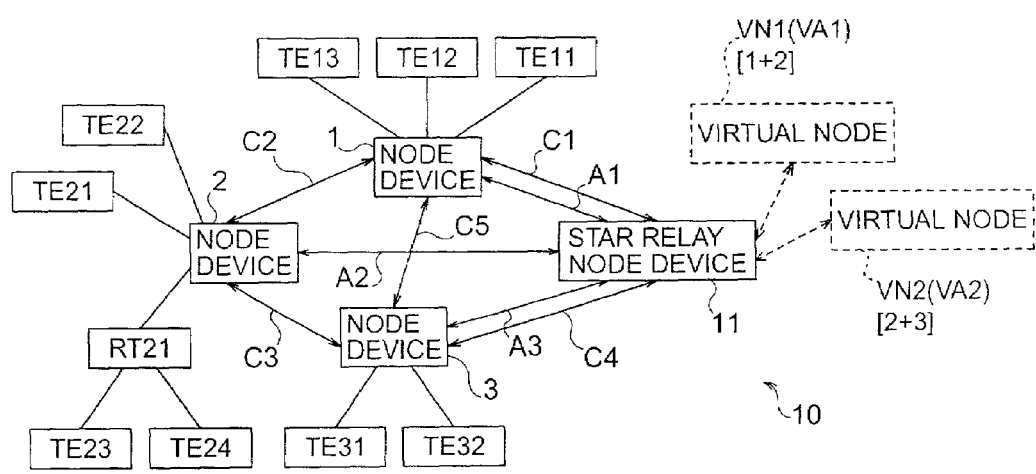
FIG. 1 is a network diagram showing an example of the logical structure of a network communication system according to a first embodiment of the invention.

Embodiments of the invention will be described with reference to the attached drawings, in which like parts are indicated by like reference characters.

FIRST EMBODIMENT

FIG. 1 shows an example of the general structure of a network communication system 10 embodying the present invention. The network communication system 10 in FIG. 1 includes node devices 1, 2, 3 and a star relay node device 11.

The node devices 1 to 3 may be terminal devices such as personal computers having networking functions, but in the present embodiment the node devices will be assumed to be routers that provide service to personal computers or other terminal equipment. Specifically, node device 1 (a router) serves terminals TE11 to TE13, node device 2 (another router) serves terminals TE21 to TE24, and node device 3 (another router) serves terminals TE31 and TE32. Terminals TE23 and TE24 are connected to node device 2 through yet another router RT21 instead of being connected to node device 2 directly. Router RT21 and terminals TE23, TE24 form a type of local area network (LAN), which may also include node device 2. Similarly, node device 1 and terminals TE11 to TE13 form a local area network, and node device 3, terminal TE31, and terminal TE32 form another local area network.

The node devices 1 to 3 and star relay node device 11 are interconnected bidirectionally by lines A1 to A3 and lines C1 to C5. Lines A1 to A3 are used for transmitting multicast packets (denoted MP2 below) containing user information. Lines C1 to C5 are used for purposes other than transmitting multicast packets: for example, to transmit multicast request packets (denoted MP1 below) requesting multicast service.

Lines A1 to A3 and lines C1 to C5 in FIG. 1 correspond to layer three, the network layer, of the Open Systems Interconnection (OSI) reference model. Therefore, FIG. 1 shows the logical network structure rather than the physical structure; other nodes, not shown in the drawing, may be physically present at arbitrary points along the lines in FIG. 1. As a specific example, the star relay node device 11 and node device 2 are shown in FIG. 1 as being interconnected directly through line A2, but other physical node devices (not shown in FIG. 1) may exist at arbitrary points along this line A2. Node devices 1 to 3 may also have communication lines (or paths of any type) other than the lines shown in FIG. 1.

The present embodiment assumes the node devices 1 to 3 to be routers, so the following description will be confined to multicasts, since broadcasts are generally stopped at routers. The difference between a broadcast and a multicast is that in a broadcast, identical packets (MP2) are sent from the relay node (star relay node device 11) to all other nodes (node devices 1, 2, 3). In a multicast, identical packets (MP2) are sent from the relay node only to a selected plurality of other nodes (for example, to node devices 1 and 2), referred to as a multicast group.

Broadcasts are generally used for distributing such information as system control information used by routers and other node equipment; the terminals (such as TE11) do not need to receive this information. Multicasts are used in delivering television and radio programming to terminals that request it, and for teleconferencing, web data distribution, and real-time distribution of multimedia information and other user information. However, if the entire communication system 10 is assumed to be a local area network (LAN) and the node devices 1 to 3 are assumed to be terminal equipment, then broadcasts can also be used for distributing user information (such as the contents of television broadcasts).

In the present embodiment, star relay node device 11 is the only node device in the network communication system 10 that relays multicast packets. Node devices 1 to 3 function as receiving node devices by receiving multicast packets relayed through star relay node device 11.

It would be possible for the network communication system 10 to have a dedicated multicast packet source node, that is, to have just one source node device for sending multicast packets and multicast request packets to the star relay node device 11. In the present embodiment, however, all node devices 1, 2, 3, or the terminals connected thereto, are assumed to be capable of functioning both as destinations of multicast packets MP2 and sources of multicast request packets MP1.

In FIG. 1, the two virtual nodes VN1, VN2 indicated by dotted lines are physically nonexistent, but they are assigned respective addresses as if they did exist. Their addresses VA1, VA2 will be referred to as virtual addresses. IP addresses of class D are preferably used as these virtual addresses VA1, VA2.

Figure 2:
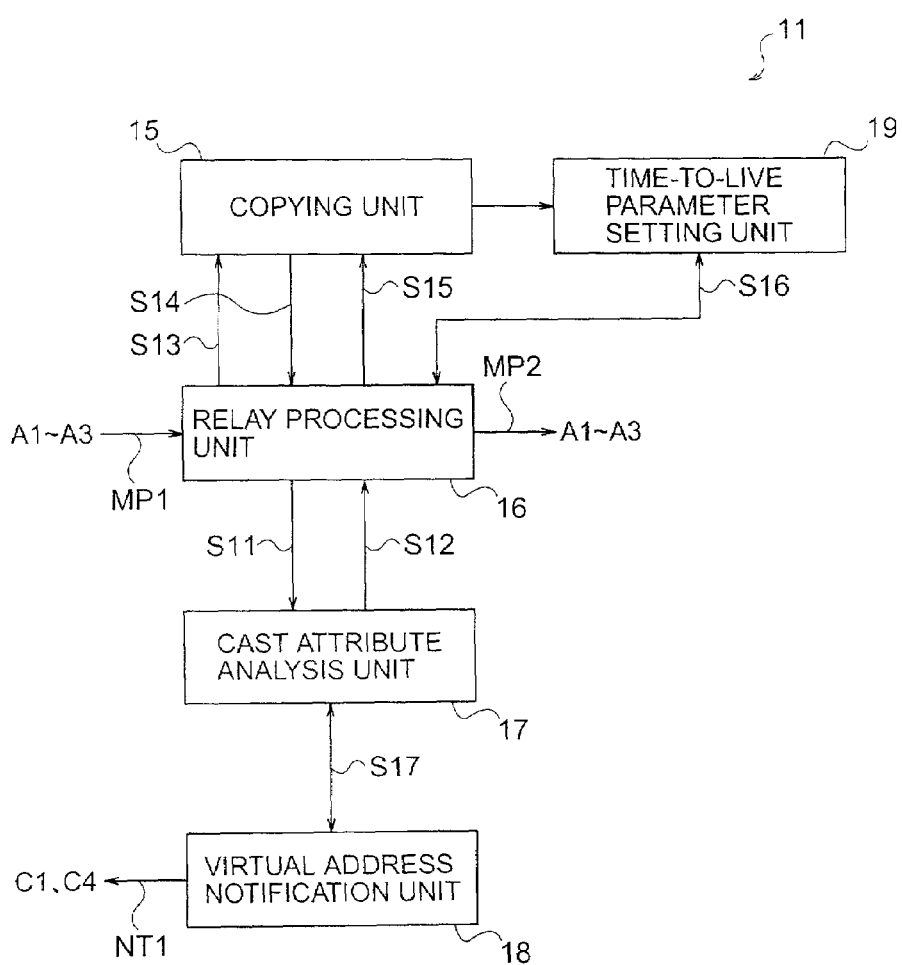
FIG. 2 is a block diagram showing components of the star relay node device in the first embodiment.

FIG. 2 shows an example of the structure of the star relay node device 11, showing only its main components. These include a copying unit 15, a relay processing unit 16, a cast attribute analysis unit 17, a virtual address notification unit 18, and a time-to-live parameter setting unit 19.

The virtual address notification unit 18 sends the virtual addresses (such as VA1) of virtual node devices (such as VN1) on lines C1 and C4 as notice information NT1, thereby informing node devices 1 to 3 of the virtual addresses as if these addresses were assigned to actual node device connected to the relay node. Notice information NT1 includes not only a virtual address but also information associating the virtual address with a group of multicast destinations, that is, with a multicast group. The virtual address notification unit 18 stores not only the virtual addresses but also information associating them with multicast groups. In this embodiment, it will be assumed that the virtual address VA1 of virtual node device VN1 is associated with node devices 1 and 2 as a multicast group, and the virtual address VA2 of virtual node device VN2 is associated with node devices 2 and 3 as a multicast group.

It is possible for a multicast group to include a virtual node device (that is, to include a virtual address). This provides one way to use a virtual node (virtual address) to designate a broadcast instead of a multicast. Another way to carry out a broadcast is to provide one virtual address associated with all node devices in the network communication system 10, so that if the star relay node device 11 receives a multicast request packet MP1 naming this virtual address, a multicast will be made to all of the node devices 1, 2, 3 in the network communication system 10.

When node device 1 or 3 receives notice information NT1 through line C1 or C4, it passes the notice information NT1 on to node device 2, so the notice information NT1 is distributed as routing information to all the node devices 1, 2, 3 in the network communication system 10. Routing protocols such as RIP (Routing Information Protocol) and OSPF (Open Shortest Path First) can be used to distribute notice information in this way.

The relay processing unit 16, which receives multicast request packets MP1 through lines A1 to A3, performs relay processing according to the multicast destinations requested by the multicast request packet MP1, thereby performing multicasts. A multicast request packet is a packet that a source node device (such as node device 2) sends to the star relay node device 11 to request execution of a multicast. A multicast request packet includes at least the user information to be multicast and multicast destination information designating the multicast destinations.

In the description below, it will be assumed that a virtual address is placed in the destination IP address section of the header field in a multicast request packet MP1 to designate the multicast destinations. On receipt of a multicast request packet MP1 through one of lines A1 to A3, accordingly, the relay processing unit 16 reads the virtual address from the destination IP address section of the header field and outputs it as signal S11 to the cast attribute analysis unit 17.

The cast attribute analysis unit 17 determines the individual multicast destinations of the multicast request packet MP1 that has been received by the relay processing unit 16. When the cast attribute analysis unit 17 receives signal S11 from the relay processing unit 16, it uses the virtual address in signal S11 as a key to retrieve the association information stored in the virtual address notification unit 18, and outputs address information indicating the multicast destinations one by one in a given order as signal S12 to the relay processing unit 16.

On receipt of signal S12, the relay processing unit 16 issues a series of copy commands S15 to the copying unit 15 to have it copy the user information contained in the multicast request packet MP1. The copying unit 15 receives the user information contained in the multicast request packet MP1 as signal S13 from the relay processing unit 16, copies the user information every time it receives a copy command S15, and returns the copied user information S14 to the relay processing unit 16.

Another function of the relay processing unit 16 is to generate a multicast packet MP2 by writing address information S12 that indicates the destination of the multicast packet MP2 into the destination IP address section (endpoint address section) of the header field in the multicast packet MP2, and writing the user information received from the copying unit 15 in the data field. The relay processing unit 16 outputs each multicast packet MP2 that it generates on the appropriate one of lines A1 to A3, leading to the multicast destination.

The time-to-live parameter setting unit 19, which is connected to the relay processing unit 16 by signal line S16, has the function of writing the minimum time-to-live value, namely "1," into the time-to-live (TTL) section in the header field of a multicast packet MP2, if the destination of the multicast packet MP2 is a node device (such as node device 3).

Since the time-to-live value of a multicast packet MP2 is decremented by at least one each time the packet passes through a router, writing the minimum value ("1") into the time-to-live section in advance can reliably prevent occurrence of unwanted traffic in the network communication system 10, and also prevents unintended loops. When the final destination of a multicast packet MP2 is a terminal (such as TE31) located beyond the destination node device (such as node device 3), however, it is necessary to set a value greater than one as the time-to-live.

A filtering unit (described later), which can be installed in node devices 1 to 3, produces substantially the same effect as the time-to-live parameter setting unit 19, so it suffices for the network communication system 10 to have one of these two types of units. If each node device 1, 2, 3 includes a filtering unit, it is not necessary for the star relay node device 11 to include a time-to-live parameter setting unit 19.

Figure 3:
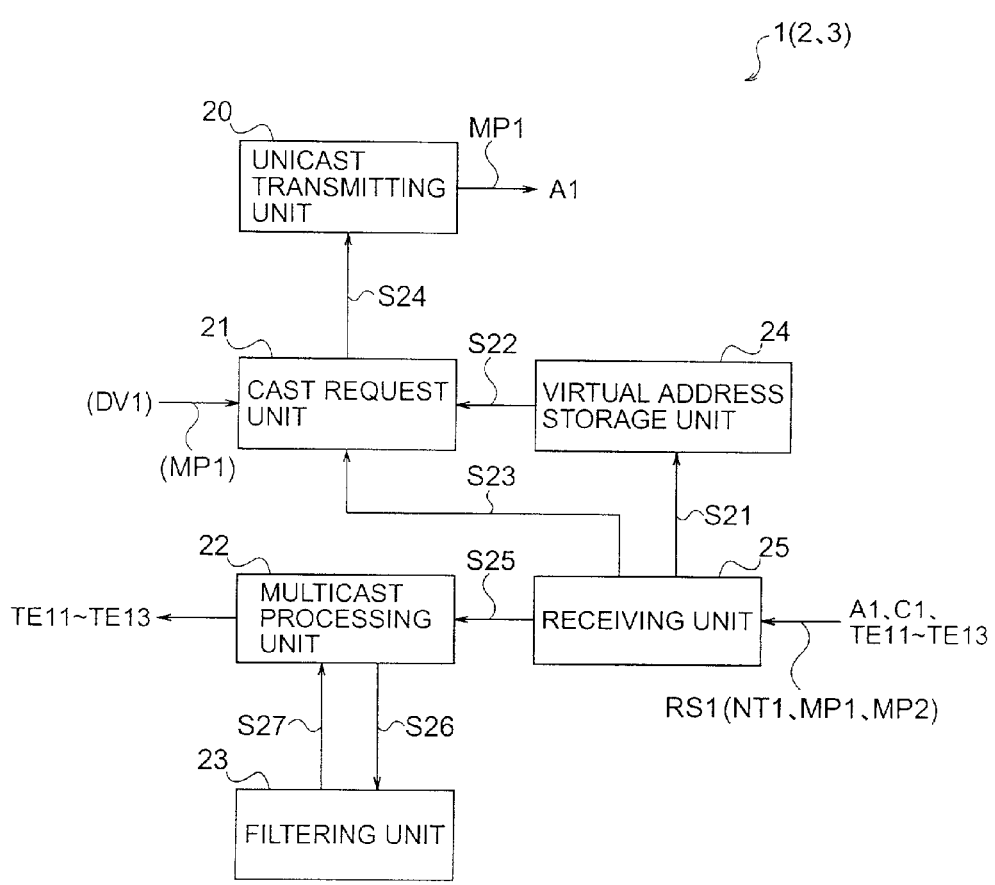
FIG. 3 is a block diagram showing components of a node device in the first embodiment.

Next, FIG. 3 shows an example of the node device structure, showing only the main components that enable communication with the star relay node device 11 through lines A1 to A3 or lines C1 and C4. The structures of node devices 1, 2, 3 may be substantially the same. In the following description, it will be assumed that FIG. 3 shows the structure of node device 1.

In this embodiment, each node device 1, 2, 3 relays multicast packets MP2 received through lines A1 to A3 only to its own connected terminals (e.g., terminals TE1 to TE3 for node device 1).

The node device 1 in FIG. 3 comprises a unicast transmitting unit 20, a cast request unit 21, a multicast processing unit 22, a filtering unit 23, a virtual address storage unit 24, and a receiving unit 25.

The receiving unit 25 receives incoming information RS1 through line A1 or C1, or from one of the connected terminals TE1 to TE3. When received from one of the connected terminals TE1 to TE3, the incoming information RS1 is a multicast request packet MP1. When received through line C1, the incoming information RS1 is notice information NT1. When received through line A1, the incoming information RS1 is a multicast packet MP2.

On reception of notice information NT1 as incoming information RS1, the receiving unit 25 reads the included virtual address (such as VA2) and the multicast destinations associated with the virtual address (node device 2 and 3 for virtual address VA2, as mentioned above), which are also included in the notice information NT1, and stores them as information S21 in the virtual address storage unit 24.

On reception of a multicast request packet MP1 as incoming information RS1 from one of terminals TE1 to TE3, the receiving unit 25 outputs information included in the header and data fields of the multicast request packet MP1 to the cast request unit 21 as information S23.

On reception of a multicast packet MP2, the receiving unit 25 supplies the multicast packet MP2 to the multicast processing unit 22 as information S25.

On receipt of information S23 from the receiving unit 25, the cast request unit 21 outputs corresponding information S24 to the unicast transmitting unit 20.

It is possible for node device 1 itself, instead of one of the terminals TE1 to TE3, to be the source of a multicast request packet MP1. In this case, the cast request unit 21 receives the multicast request packet MP1 (or information designating the contents thereof) from an input device DV1 installed in the node device 1. The structure in FIG. 3 thus allows node device 1 to be used as a terminal. On receipt of a multicast request packet MP1 from input device DV1, the cast request unit 21 may refer to the information S21 stored in the virtual address storage unit 24 to identify the virtual address (such as VA2) corresponding to the desired multicast destinations.

In either case, the cast request unit 21 outputs information S24 corresponding to a multicast request packet MP1 to the unicast transmitting unit 20. When the receiving unit 25 receives a multicast request packet MP1 as incoming information RS1 from one of terminals TE1 to TE3, the sending terminal must possess stored information corresponding to virtual address information S21 (or S22).

The unicast transmitting unit 20 receives information S24 from the cast request unit 21, and sends a multicast request packet MP1 corresponding to information S24 to the star relay node device 11 through line A1. Only one multicast request packet MP1 is sent per multicast request. The unicast transmitting unit 20 sends the multicast request packet MP1 by ordinary unicast processing (such as addressing and routing), specifying a virtual address (such as VA1) as the destination. Therefore, the degree of complexity of the routing and other processing is no greater than in an ordinary unicast.

The multicast processing unit 22 receives information S25 from the receiving unit 25 and performs processing according to the multicast packet MP2 corresponding to information S25. Specifically, the multicast processing unit 22 supplies a network address included in the destination address section of the header field in the multicast packet MP2 as information S26 to the filtering unit 23; the filtering unit 23 determines whether the network address designated by this information S26 matches a network address preassigned to node device 1 as a router or not, and notifies the multicast processing unit 22 of the result in return information S27. If the network address matches the preassigned address, the multicast processing unit 22 executes further processing to receive the multicast packet MP2 and transfer the multicast packet MP2 to one or more of the connected terminals TE1 to TE3. If the network address does not match the preassigned address, the multicast processing unit 22 discards the multicast packet MP2.

The class D addresses used in general multicasts cannot designate individual terminals (hosts). Therefore, if a multicast is performed by writing a class D address into the destination IP address section of a multicast packet MP2, when information S26 matches the network address preassigned to node device 1, the multicast processing unit 22 sends the multicast packet MP2 to all the connected terminals TE1 to TE3.

The filtering unit 23 can be omitted when the star relay node device 11 includes the time-to-live parameter setting unit 19 described above, but in the present embodiment, since node devices 1 to 3 are assumed to be routers, the star relay node device 11 must recognize the internal structure of their connected LANs to some extent in order to set an appropriate time to live. Since filtering is not subject to such constraints, it is more advantageous in the present embodiment to use the filtering units 23 than to use the time-to-live parameter setting unit 19.

If node devices 1 to 3 are assumed to be terminals, all the time-to-live values of the multicast packets MP2 transferred to node devices 1 to 3 can be set to "1." In this case, it is likely to be more efficient to include a time-to-live parameter setting unit 19 in the star relay node device 11 than to include filtering units 23 in the node devices 1 to 3.

In addition, if necessary, the node devices 1 to 3 can be equipped with a multiplexer that multiplexes the signal received from a line (such as A1) for receiving multicast packets MP2 with signals received from other lines (such as C1 and C2), and sends the multiplexed signal to the connected terminals TE1 to TE3 or other destinations.

A description will now be given of the operation of the first embodiment on the basis of the above structure.

First, notice information NT1 is sent from the star relay node device 11 to the receiving unit 25 in each node device 1, 2, 3 in the network communication system 10 in FIG. 1 through, for example, lines C1, C4, C3, and information S21 corresponding to notice information NT1 is stored in the virtual address storage unit 24 of each node device 1, 2, 3.

For example, information associating virtual node device VN1 (virtual address VA1) with node devices 1 and 2 is received in notice information NT1 and stored in the virtual address storage unit 24. Similarly, information associating virtual node device VN2 (virtual address VA2) with node devices 2 and 3 is received and stored.

After this information S21 has been stored, a multicast request packet MP1 may be sent from or through node device 1, 2, or 3 to the star relay node device 11.

When, for example, a terminal (such as TE11) connected to node device 1 sends a multicast request packet MP1 to node device 1, the receiving unit 25 in node device 1 receives the multicast request packet MP1, and outputs information S23 to the cast request unit 21.

The cast request unit 21 outputs information S24 corresponding to the information S23 it has received to the unicast transmitting unit 20; the unicast transmitting unit 20 sends a request packet MP1 corresponding to information S24 on line A1. The routing algorithm executed by the unicast transmitting unit 20 at this time is relatively simple, as in an ordinary unicast.

Next, the relay processing unit 16 in the star relay node device 11 receives the multicast request packet MP1 from line A1, obtains the processing results of the copying unit 15 and cast attribute analysis unit 17 (and the time-to-live parameter setting unit 19, if required) as signals S15 and S12 (and S16), respectively, and sends a multicast packet MP2 to each multicast destination.

Multicast packets MP2 can be sent out on all three lines A1 to A3, but in this embodiment, it is assumed that multicast packets are sent only on the lines leading to the multicast destinations designated by the multicast request packet MP1 (for example, only lines A2 and A3 if multicast request packet MP1 has virtual address VA2 in its destination IP address section).

As can be seen in FIG. 1, lines A1 to A3 form a star network topology, centered on the star relay node device 11, to which the node devices 1 to 3 are directly connected with a hop count of one, at least in the network layer. Therefore, defining lines A1 to A3 requires no complicated routing algorithms, and looped paths can be completely and unfailingly avoided, thereby assuring excellent simultaneity and real-time performance of the distribution of multicast packet MP2 to the node devices 1 to 3. Looped paths are avoided because multicast packets MP2 are prevented from propagating beyond their intended destinations by the time-to-live parameter setting unit 19 (or the filtering units 23). Since lines A1 to A3 are connected to the star relay node device 11 directly, the star relay node device 11 has direct and reliable knowledge of the operational status of lines A1 to A3, and can easily allocate equal amounts of bandwidth for sending multicast packets MP2 to node devices 1, 2, and 3. Problems (1) to (4) of the prior art are therefore solved.

These problems (1) to (4) may still arise in the transfer of multicast packets MP2 beyond the node devices 1 to 3, as when multicast packets MP2 are transferred from node device 1 to its connected terminals TE1 to TE3. This depends on the structure of the LAN comprising the node device 1 and terminals TE1 to TE3. Within a LAN, however, it is possible to solve or at least mitigate problems (1) to (4) by adopting the same structure as between the star relay node device 11 and node devices 1 to 3.

Figure 4:
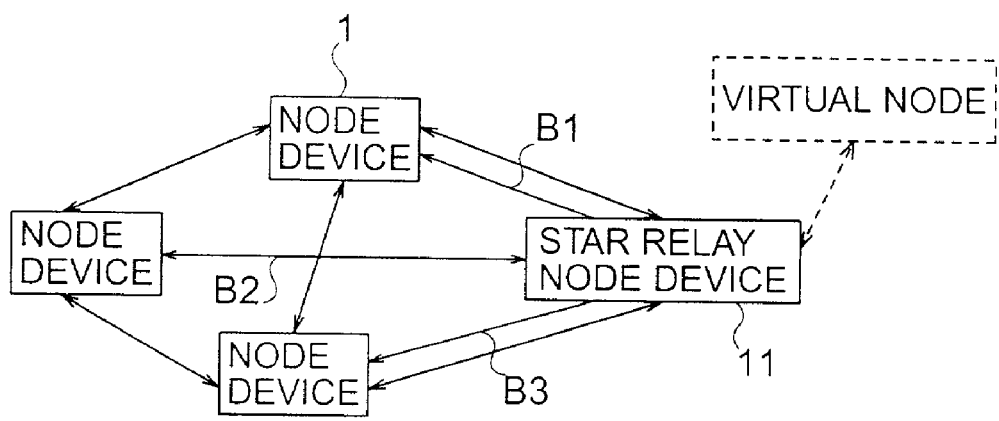
FIG. 4 is a network diagram showing an example of the logical structure of a network communication system according to a variation of the first embodiment.

In the description above, lines A1 to A3 were assumed to be bidirectional. It is possible to use unidirectional lines from the star relay node device 11 to the node devices 1 to 3, such as the lines B1 to B3 shown in FIG. 4, but it is then necessary to provide separate lines for sending multicast request packets MP1 from the node devices 1 to 3 to the star relay node device 11. Lines C1 to C5 can serve this purpose, for example.

If lines C1 to C5 are used to send multicast request packets MP1 to the star relay node device 11, the multicast request packets MP1 may be delayed en route to the star relay node device 11, depending on the degree of congestion at other nodes along the path (for example, a multicast request packet MP1 sent from node device 2 through line C2, node device 1, and line C1 to the star relay node device 11 may be delayed by congestion in node device 1). Real-time performance may therefore be degraded, but since multicast packets MP2 are distributed from the star relay node device 11 to the node devices 1 to 3 through lines A1 to A3, the other effects of the invention, such as equal bandwidth and simultaneity, are not impaired.

According to the first embodiment, multicast packets (MP2) can be transferred by use of a simplified routing algorithm, over paths having uniform bandwidth, with improved real-time performance, simultaneity, and reliability. Consequently, it is possible to achieve high-quality multicasts with simpler algorithms than before.

The communication system described in the first embodiment is suitable for use in any multicast or broadcast communication applications in which a high degree of simultaneity and real-time performance is essential. For example, the first embodiment can be adapted to communication applications, such as correct-time broadcasting, that require extremely precise real-time performance.

SECOND EMBODIMENT

The second embodiment will be described below only insofar as it differs from the first embodiment. The difference between the two embodiments is that the second embodiment uses optical communication lines and wavelength division multiplexing (WDM).

Figure 5:
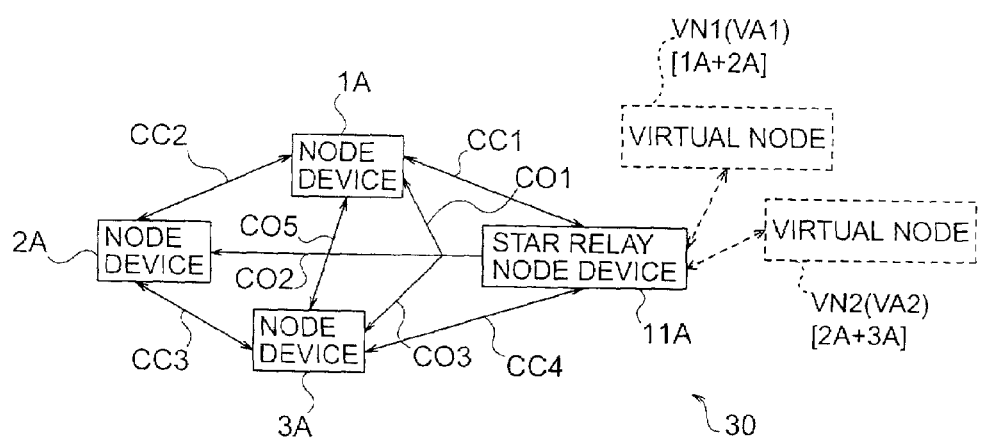
FIG. 5 is a network diagram showing an example of the logical structure of a network communication system according to a second embodiment of the invention.

FIG. 5 shows an example of the overall structure of a network communication system 30 according to the second embodiment. The network communication system 30 comprises node devices 1A, 2A, 3A and a star relay node device 11A. Elements in FIG. 5 indicated by the same reference characters as in FIG. 1, or by similar reference characters, have corresponding functions. Specifically, the functions of virtual nodes VN1 and VN2 are the same as in FIG. 1, node devices 1A, 2A, 3A correspond to node devices 1, 2, 3 in FIG. 1, star relay node device 11A corresponds to star relay node device 11 in FIG. 1, and lines CC1, CC2, CC3, CC4, CC5 correspond to lines C1, C2, C3, C4, C5 in FIG. 1. Lines CO1, CO2, CO3 correspond to lines A1, A2, A3 in FIG. 1, but are used only for unidirectional communication, and are combined into a single line entering the star relay node device 11A.

The separate lines CC1–CC5 and CO1–CO4 in FIG. 5 need not all be physically distinct. For example, lines CC1 and CO1 may be logical lines comprising different groups of wavelengths transmitted in a single optical signal. All of the lines in FIG. 5 may be accommodated as such wavelength groups within, for example, an optical ring network linking node devices 1A, 2A, 3A and star relay node device 11A. In this case, lines CO1, CO2, CO3 have a logical star topology rather than a physical star topology. For example, signals on line CO2 may physically pass through node device 1A, but they pass through node device 1A without being processed or delayed, which is logically the same as being sent directly to node device 2A.

Figure 6:
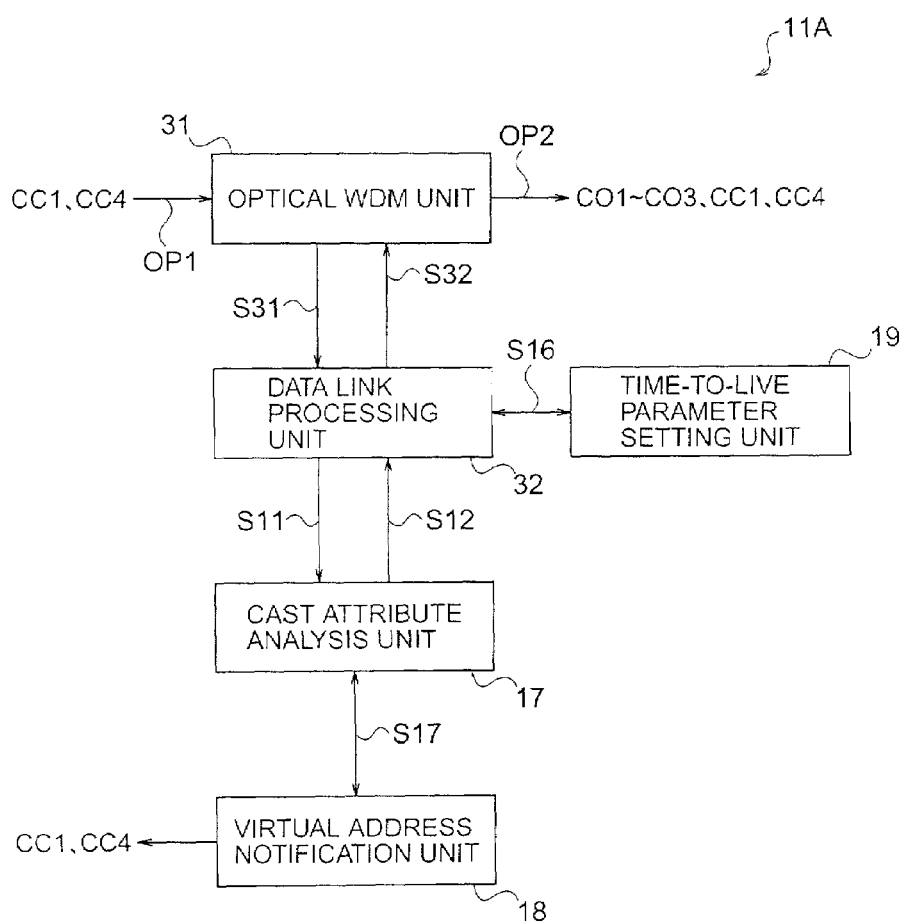
FIG. 6 is a block diagram showing components of the star relay node device in the second embodiment.
Figure 7:
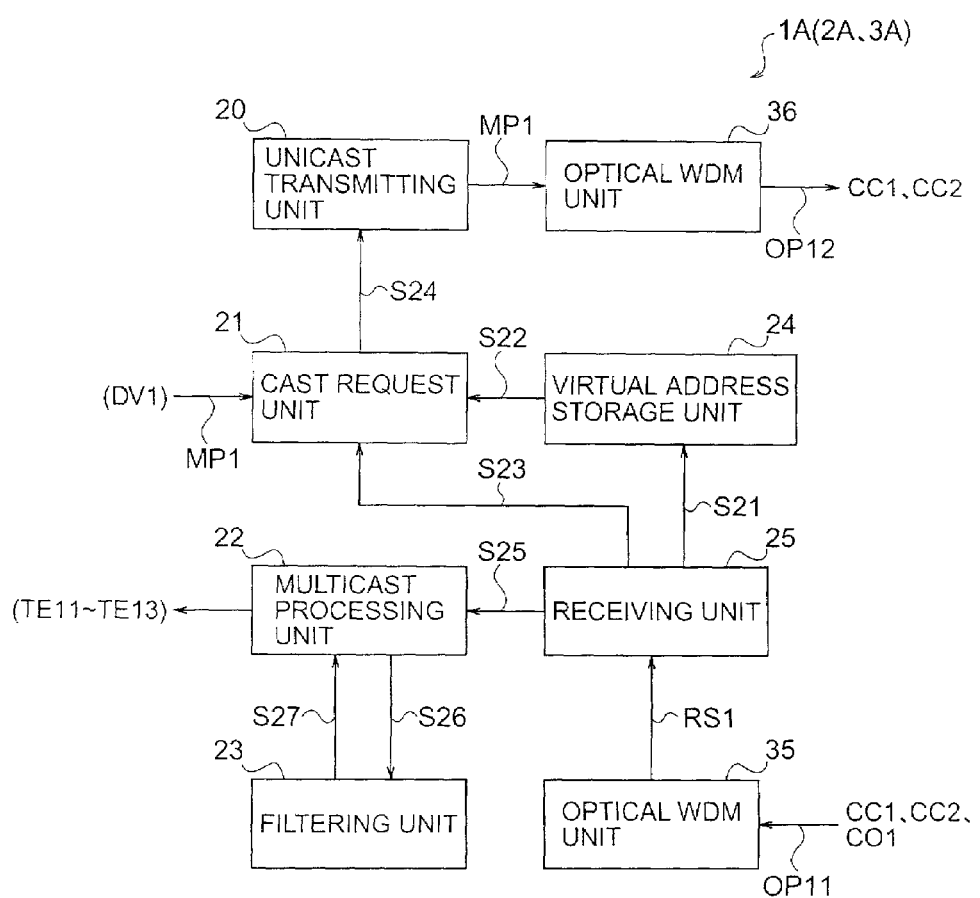
FIG. 7 is a block diagram showing components of a node device in the second embodiment.

FIG. 6 shows an example of the structure of the main components of the star relay node device 11A. The cast attribute analysis unit 17, virtual address notification unit 18, and time-to-live parameter setting unit 19 have the same functions as the corresponding components in FIG. 2. FIG. 7 shows an example of the structure of the main components of node device 1A (node devices 2A and 3A have a similar structure). The unicast transmitting unit 20, cast request unit 21, multicast processing unit 22, filtering unit 23, virtual address storage unit 24, and receiving unit 25 have the same functions as the corresponding components in FIG. 3.

The optical WDM unit 31 in FIG. 6 multiplexes and demultiplexes the wavelengths of an optical input signal OP1 and an optical output signal OP2. As indicated, the optical input signal OP1 may include wavelengths of logical lines CC1 and CC4; the optical output signal OP2 may include wavelengths of logical lines CO1–CO3, CC1, and CC4. Optical WDM unit 31 includes an optical-electrical converter and an electrical-optical converter (not shown) for converting some or all of the wavelengths of the optical input signal OP1 to electrical signals, and converting electrical signals to optical signals that are multiplexed into the optical output signal OP2. At least one wavelength of the optical input signal OP1 is converted to an electrical signal S31 supplied to a data link processing unit 32. Some wavelengths of the input optical signal OP1 (e.g., wavelengths belonging to logical lines CC2, CC3, and CC5) may be passed directly to the output optical signal OP2.

The data link processing unit 32 receives electrical signal S31 from optical WDM unit 31 and outputs an electrical signal S32 to optical WDM unit 31, performing functions equivalent to those of the relay processing unit 16. Specifically, when the data link processing unit 32 detects from electrical signal S31 that optical signal OP1 includes a multicast request packet MP1, it outputs a multicast packet MP2 addressed to the requested multicast destinations in electrical signal S32, to be transmitted in optical signal OP2. The same multicast packet MP2 may be sent on all three lines CO1 to CO3 by using the same optical wavelength $\lambda_1$ in optical signal OP2. In this case, the star relay node device 11A preferably reserves wavelength $\lambda_1$ for multicast uses, or uses wavelength $\lambda_1$ preferentially for multicasts whenever star relay node device 11A receives multicast requests.

In FIG. 7, an optical WDM unit 35 demultiplexes the optical wavelengths of an input optical signal OP11, and another optical WDM unit 36 multiplexes the optical wavelengths of an output optical signal OP12. Although FIG. 7 shows optical WDM units 35, 36 as separate components, they can be combined into a single component similar to the optical WDM unit 31 in FIG. 6.

Optical WDM unit 36 can send multicast request packets MP1 on line CC1 (or CC2) in optical signal OP12. Optical WDM unit 35 can receive multicast packets MP2 in optical signal OP11 from line CO1. If optical WDM unit 31 in star relay node device 11A uses optical wavelength $\lambda_1$ to send multicast packets MP2 in optical signal OP2 on lines CO1 to CO3, as described above, then optical WDM unit 35 in node device 1A receives the multicast packets MP2 from wavelength $\lambda_1$ in optical signal OP11.

It is also possible to use different optical wavelengths for different groups of multicast destinations. If the destination IP address of a multicast request packet MP1 is virtual address VA1, for example, requesting a multicast to node devices 1A and 2A, star relay node device 11A may use a predetermined wavelength $\lambda_2$ to send the corresponding multicast packet MP2; if the destination IP address of the multicast request packet MP2 is virtual address VA2, requesting a multicast to node devices 2A and 3A, star relay node device 11A may use a different wavelength $\lambda_3$ to send the corresponding multicast packet MP2.

In either case, use of the optical WDM units 31, 35, 36 eliminates the need for the copying unit 15 that was required in the first embodiment, and the need for electronic copying of the multicast packets MP2.

The second embodiment uses optical multiplexing technology, but it is also possible to use frequency-division multiplexing of electrical signals. In that case, a multicast packet MP2 is sent as an electrical signal.

The second embodiment provides the same effects of high-quality multicasting by simplified processing as in the first embodiment. In addition, the second embodiment eliminates the need for the copying process that was required in the first embodiment.

THIRD EMBODIMENT

The third embodiment will be described below only insofar as it differs from the first embodiment. The difference is that the third embodiment dispenses with virtual nodes (and virtual addresses), and has the node device that requests a multicast perform source routing. Source routing allows the sending (source) node to designate paths under the internet protocol described in the document Request for Comments 791.

Figure 8:
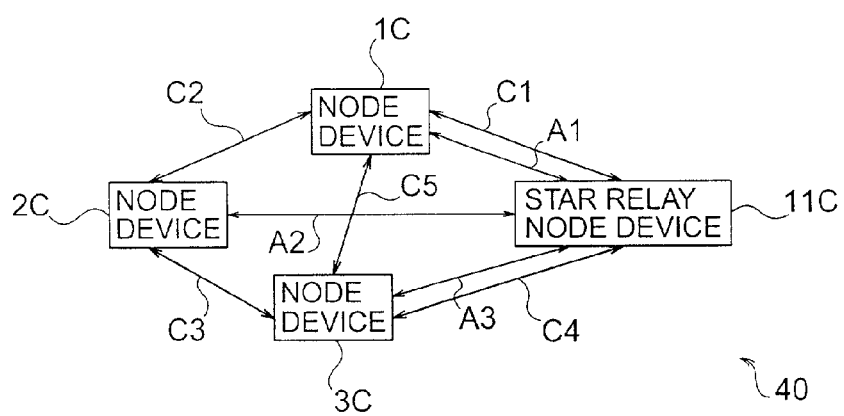
FIG. 8 is a network diagram showing an example of the logical structure of a network communication system according to the third embodiment.
Figure 9:
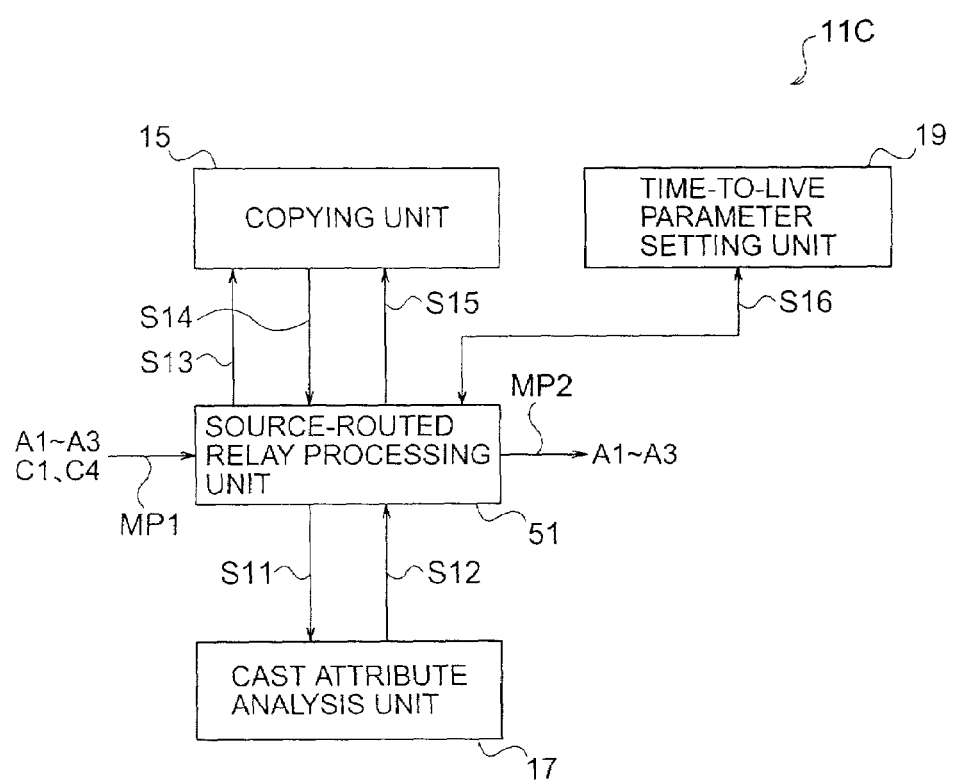
FIG. 9 is a block diagram showing components of the star relay node device in the third embodiment.
Figure 10:
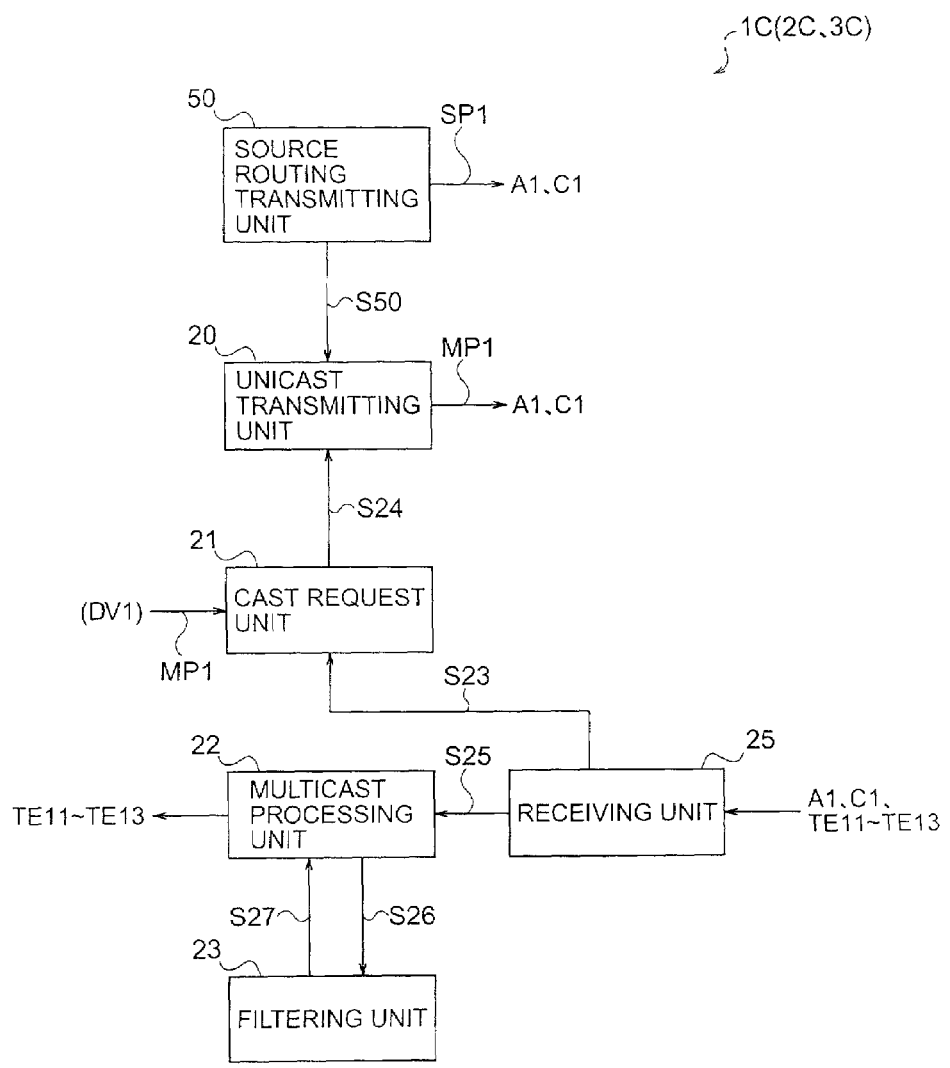
FIG. 10 is a block diagram showing the components of a node device in the third embodiment.

FIG. 8 shows an example of the overall structure of a network communication system 40 according to the third embodiment. FIG. 9 shows an example of the structure of the main parts of the star relay node device 11C in the third embodiment; FIG. 10 shows an example of the structure of the main parts of node devices 1C to 3C. Signals and other elements in FIGS. 9 and 10 indicated by the same reference characters as in FIGS. 2 and 3 have corresponding functions.

The node devices in the third embodiment will now be described with reference to FIG. 10. It will be assumed that FIG. 10 shows node device 1C. Descriptions of the unicast transmitting unit 20, cast request unit 21, multicast processing unit 22, filtering unit 23, and receiving unit 25 will be omitted, as these elements were described in the first embodiment.

The source routing transmitting unit 50 in FIG. 10 sends a signaling packet SP1 on line C1 or A1 (or line C2 or C5) to reserve paths for source routing. Source routing can be based on either a full path definition or a partial path definition. The former type of definition designates all nodes along a path; the latter designates only essential nodes and omits other nodes along the path. The source routing transmitting unit 50 can use either type of path definition, provided that it at least designates the star relay node device 11C and the node devices (such as node devices 2C and 3C) that may become destinations of multicast packets MP2.

On completion of path definition by source routing, the source routing transmitting unit 50 uses signal S50 to notify the unicast transmitting unit 20 that paths have been defined. This allows the unicast transmitting unit 20 to send a multicast request packet MP1 requesting use of the defined paths. The corresponding multicast is carried out by a source-routed relay processing unit 51 in the star relay node device 11C shown in FIG. 9.

Aside from using source routing, the source-routed relay processing unit 51 in FIG. 9 is similar to the relay processing unit 11 in the first embodiment. The star relay node device 11C also includes the copying unit 15, cast attribute analysis unit 17, and time-to-live parameter setting unit 19 described in the first embodiment.

As is apparent from FIGS. 9 and 10, the star relay node device 11C in the third embodiment has no component corresponding to the virtual address notification unit 18 in the first embodiment, and the node devices 1C to 3C have no component corresponding to the virtual address storage unit 24 in the first embodiment.

The third embodiment provides the same effects of high-quality multicasting by simplified processing as in the first embodiment. In addition, since the third embodiment does not require virtual nodes (VN1 and VN2), the size of the routing tables in the node devices (1C, 2C, 3C) can be reduced, as compared with the first embodiment, and the virtual address notification unit and virtual address storage units can be eliminated.

In the embodiments described above, the node devices 1 to 3, 1A to 3A, and 1C to 3C are configurable with a unicast router, but if so required, the node devices may also have multicasting functions.

Needless to say, the number of nodes connected to the star relay node device is not limited to the three nodes shown in the embodiments; there can be more or less than three nodes.

Similarly, the communication system can have star relay node devices at more than one node.

Those skilled in the art will recognize that further variations are possible within the scope claimed below.

What is claimed is:

1. A network communication system in which a source node sends identical information to a plurality of destination nodes, comprising:
   a relay node having a star relay node device for receiving the identical information from the source node and sending the identical information to the plurality of destination nodes; and
   a plurality of predetermined communication paths linking the relay node to the destination nodes in a star topology centered on the relay node, the identical information being sent through said predetermined communication paths to the destination nodes,
   wherein the star relay node device at the relay node includes a virtual address notification unit for notifying the source node of a virtual address corresponding to said plurality of destination nodes, and the source node sends the identical information to the plurality of destination nodes by sending the identical information to the relay node and specifying the virtual address as a destination address.

2. The network communication system of claim 1, comprising a plurality of network nodes coupled to the relay node, each network node among said network nodes having a node device making said network node operable as said source node and, at different times, to operate as one of said destination nodes.

3. The network communication system of claim 2, wherein the node device at said network node includes:
   a request unit for generating a request to send the identical information to the plurality of destination nodes;
   a unicast processing unit for sending said request and said identical information to the relay node;
   a receiving unit for receiving said identical information and said virtual address; and
   a virtual address storage unit for storing said virtual address.

4. A network communication system in which a source node sends identical information to a plurality of destination nodes, comprising:
   a relay node having a star relay node device for receiving the identical information from the source node and sending the identical information to the plurality of destination nodes; and
   a plurality of predetermined communication paths linking the relay node to the destination nodes in a star topology centered on the relay node, the identical information being sent through said predetermined communication paths to the destination nodes,
   wherein the identical information includes a time-to-live parameter, and the star relay node device includes a time-to-live parameter setting unit for assigning a minimum value to the time-to-live parameter.

5. A network communication system in which a source node sends identical information to a plurality of destination nodes, comprising:
   a relay node having a star relay node device for receiving the identical information from the source node and sending the identical information to the plurality of destination nodes; and
   a plurality of predetermined communication paths linking the relay node to the destination nodes in a star topology centered on the relay node, the identical information being sent through said predetermined communication paths to the destination nodes,
   wherein the identical information is accompanied by address information, and each of the destination nodes has a node device comprising:
   a filtering unit for comparing the address information accompanying the identical information with predetermined address information; and
   a multicast processing unit for receiving the identical information if the accompanying address information matches the predetermined address, and discarding the identical information if the accompanying address information fails to match the predetermined address.

6. A method of sending identical information from a source node to a plurality of destination nodes in a communication network, wherein the identical information is accompanied by address information, comprising the steps of:
   (a) sending the identical information from the source node to a predetermined relay node;
   (b) sending the identical information from the predetermined relay node to the destination nodes over predetermined communication paths connecting the destination nodes to the predetermined relay node in a star topology;
   (c) comparing the address information included in the identical information with predetermined address information at at least one of the destination nodes;
   (d) transferring the identical information from said one of the destination nodes to equipment connected to said one of the destination nodes by a communication path, if the address information accompanying the identical information matches the predetermined address information; and
   (e) discarding the identical information at said one of the destination nodes if the address information accompanying the identical information fails to match the predetermined address information.

7. A method of sending identical information from a source node to a plurality of destination nodes in a communication network, comprising the steps of:
   (a) sending the identical information from the source node to a predetermined relay node;
   (b) sending the identical information from the predetermined relay node to the destination nodes over predetermined communication paths connecting the destination nodes to the predetermined relay node in a star topology; and
   (c) setting a time to live of the identical information to a minimum value at the relay node.

* * * * *